(12) United States Patent
Asano et al.

(10) Patent No.: US 6,439,029 B2
(45) Date of Patent: Aug. 27, 2002

(54) METHOD OF DETECTING A KNOCK IN AN INTERNAL COMBUSTION ENGINE BY MEANS OF IONIC CURRENT

(75) Inventors: Morito Asano; Atsushi Ito; Teruji Ichihara; Yoshiyuki Fukumura, all of Osaka (JP)

(73) Assignees: Daihatsu Motor Co., Ltd.; Diamond Electric Mfg. Co., Ltd., both of Osaka (JP)

(*) Notice: Subject to any disclaimer, the term of this patent is extended or adjusted under 35 U.S.C. 154(b) by 0 days.

(21) Appl. No.: 09/783,019

(22) Filed: Feb. 15, 2001

(30) Foreign Application Priority Data

Feb. 25, 2000 (JP) .......................................... 2000-049034

(51) Int. Cl.$^7$ .............................................. G01L 23/22
(52) U.S. Cl. ........................................................ 73/35.08
(58) Field of Search ............................ 73/35.08, 117.2, 73/117.3; 324/378

(56) References Cited

U.S. PATENT DOCUMENTS 5,803,047 A 9/1998 Rask
6,011,397 A * 1/2000 Yasuda ........................ 324/388
6,230,546 B1 5/2001 Wilstermann et al.

FOREIGN PATENT DOCUMENTS

| DE | 19810523 A | 9/1998 |
|---|---|---|
| DE | 19826714 A | 12/1998 |
| EP | 0828076 A | 3/1998 |
| EP | 0922948 A | 6/1999 |
| JP | 59-079827 A | 5/1984 |
| JP | 06-15129 | 6/1994 |
| JP | 11-002174 | 6/1999 |
| WO | WO 89/11087 A | 11/1989 |

* cited by examiner

Primary Examiner—Richard A. Moller
(74) Attorney, Agent, or Firm—Banner & Witcoff, Ltd.

(57) ABSTRACT

There is provided an improved method of detecting an occurrence of a knock in an internal combustion engine by detecting an ionic current flowing in a cylinder of the engine from initiation of combustion therein and judging a knock component overlapping the ionic current based on a judging level, the method including the steps of: detecting a peak value of the ionic current; and relatively correcting at least one of the judging level and the knock component based on the peak value thus detected so as to make more difficult a judgment of whether the knock occurs or not as the detected peak value increases.

10 Claims, 6 Drawing Sheets

METHOD OF DETECTING A KNOCK IN AN INTERNAL COMBUSTION ENGINE BY MEANS OF IONIC CURRENT

BACKGROUND OF THE INVENTION

1. Field of the Invention

The present invention relates to a method of detecting a knock that occurs in an internal combustion engine based on the characteristics of an ionic current.

2. Description of the Related Art

A typical method of detecting a knock occurring in an internal combustion engine utilizes a vibration-type knock sensor for detecting such a knock. Signals from this knock sensor are judged in a predetermined section to detect knocks. More specifically, signals in a predetermined frequency band are taken out of the signals from the knock sensor and then processed for the detection of knocks.

Another approach has been attempted recently to detect a knock by passing an ionic current in a combustion chamber immediately after ignition and detecting a knock component overlapping the ionic current. One known such approach is such as to separate a knock component overlapping the ionic current and determine whether a knock occurs or not based on the knock component thus separated, as disclosed in, for example, Japanese Patent Laid-Open Gazette No. H6-159129. On the other hand, the art described in Japanese Patent Laid-Open Gazette No. H11-2174 establishes a reference level for judgment of the occurrence of a knock based on the mean value of an ionic current up to that time and compares a knock component with the reference level thereby to detect the occurrence of a knock.

In the art of detecting a knock by using an ionic current as above, the waveform of the ionic current to be detected is found to vary depending upon the electrical characteristics of a processing circuit and other conditions upon detection. An ionic current waveform attains its peak or maximum with substantially the same timing with the peak of combustion at which the combustion pressure reaches its maximum. In general, a knock component overlaps the ionic current at a point past the peak of the ionic current waveform.

If, for example, the peak value of an ionic current is substantially doubled due to variations in driving conditions or detecting conditions, a knock component overlapping the ionic current also is substantially doubled. Accordingly, if the knock-judging level is established based on such an inconstant ionic current, the knock-judging level thus established is also inconstant and, hence, learning becomes necessary every time the ionic current is detected. Since the peak of the ionic current varies substantially simultaneously with the peak of the combustion pressure, the learning of the knock-judging level cannot absorb fluctuations of the knock-judging level unless such learning is conducted in each driving state of the internal combustion engine. Such learning, however, is required to vary to accommodate different learning regions established according to driving regions and is conducted for all the learning regions and, hence, control therefor becomes complicated. Further, the latter prior art technique has a limitation in judging accuracy because the judgment of the occurrence of a knock in an occasion of combustion is effected with reference to a reference level established based on the ionic current in occasions of combustion preceding the occasion of combustion for detection.

The present invention intends to overcome such inconveniences.

SUMMARY OF THE INVENTION

According to the present invention, there is provided a method of detecting an occurrence of a knock in an internal combustion engine by detecting an ionic current flowing in a cylinder of the engine from initiation of combustion therein and judging a knock component overlapping the ionic current based on a judging level, the method comprising the steps of: detecting a peak value of the ionic current; and relatively correcting at least one of the judging level and the knock component based on the peak value thus detected to make more difficult a judgment of whether the knock occurs or not as the detected peak value increases.

The method makes more difficult the judgment of whether a knock occurs or not as the detected peak value increases by relatively correcting at least one of the knock component and the judging level. Accordingly, even when the knock component is apparently enlarged to a level higher than its real level with increasing peak value of the ionic current, such a knock component apparently higher than its real level can be excluded from the detection of a knock. Thus, the method offers an improved knock detection accuracy. For instance, the method will not make a detection error such that a knock component that is really too small to judge as a knock but appears to be enlarged to a value higher than its real level due to a peak value of the ionic current increased by fluctuations in driving state is erroneously detected as an indication of the occurrence of a knock. Thus, the method is capable of detecting only knock components indicative of real knocks thereby accurately detecting occurrences of knocks. Further, the method is capable of detecting a knock occurring in an occasion of combustion based on the value of a peak appearing in the same occasion thereby detecting occurrences of knocks without any detection error even in a transient period of combustion in which the driving state is inconstant.

In the above method, the correction of at least one of the judging level and the knock component may be made in at least one of a direction such as to decrease the knock component as the peak current increases and a direction such as to raise the judging level as the peak current increases. Since the correction is made such that the knock component is relatively decreased as the peak value of the ionic current increases, the method having this feature can assuredly prevents a detection error even if an apparent knock appears to have a magnitude equal to the magnitude of a real knock and hence enjoys an improved detection accuracy.

Preferably, the judging level is determined based on a reference level for judging the knock component, the reference level being calculated from a peak value of the ionic current in a normal combustion free of the knock. The method having this feature is capable of correcting the judging level to a proper level by correcting the calculated reference level obtained in the normal combustion free of a knock with an actually measured value. Advantageously, the method has a feature such that the judging level is determined as a value obtained by multiplying the reference level by a factor of a positive number N and compared with the knock component or the judging level is determined as being equal to the reference level and compared with a value obtained by dividing the knock component by a factor of a positive number M. With such a feature, the judging level can be properly established in a manner to accommodate variability of the reference level. When the factor by which the reference level is multiplied or the knock component is divided is variable according to driving states, for example, according to the number of revolutions of the engine or the load imposed on the engine, a further improvement in detection accuracy will result.

In order to minimize the influence of noise produced in an actual driving state of the internal combustion engine, it is preferred that the method further comprise the step of detecting a noise component overlapping the ionic current in a driving state free of a noise during a knock component detecting period, wherein the correction of one of the judging level and the knock component is made based on the noise component thus detected. This feature makes it possible to judge a knock with exclusion of different noises, particularly white noises or analogous noises, which result from variability in the manufacture of an electric circuit adapted to process the ionic current or from different driving states, thereby bringing an improved judgment accuracy.

The foregoing and other objects, features and attendant advantages of the present invention will become apparent from the reading of the following detailed description with reference to the attached drawings.

DETAILED DESCRIPTION OF THE PREFERRED EMBODIMENTS

The present invention will now be described by way of the preferred embodiments thereof with reference to the attached drawings.

Figure 1:
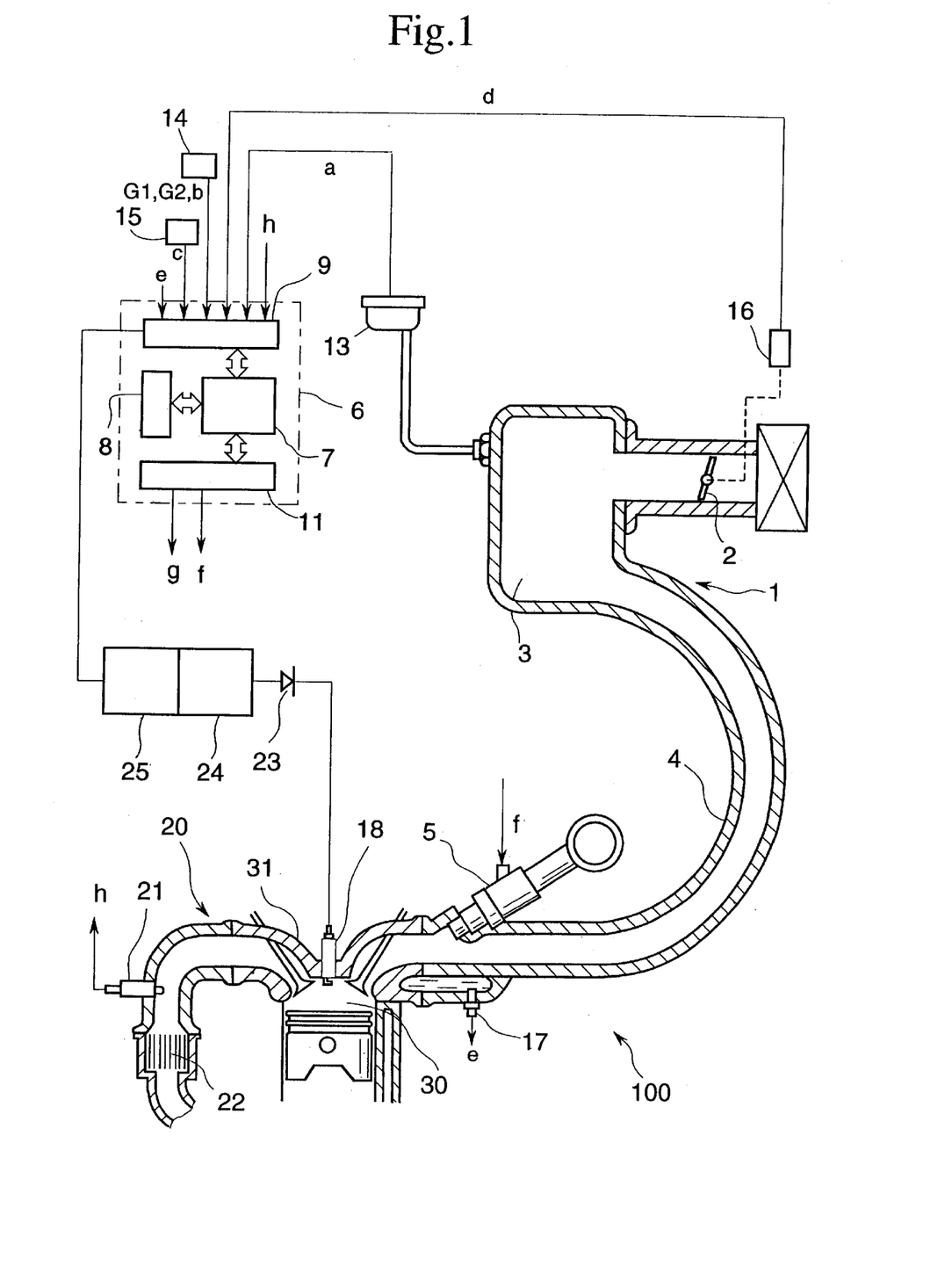
FIG. 1 is a schematic view illustrating the configuration of one embodiment of the present invention.

Referring first to FIG. 1 schematically showing an automobile engine 100 having four cylinders, the engine 100 includes an intake system 1 provided with a throttle valve 2 which opens or closes in response to an operation of an accelerator pedal (not shown), and a surge tank 3 disposed downstream of the valve 2. An intake manifold 4 in communication with the surge tank 3 is provided with a fuel injection valve 6 adjacent an end on the side away from the surge tank 3. The fuel injection valve 5 is controlled by an electronic control device 6 so as to inject fuel into each of the cylinders independently of the others. A cylinder head 31 defining a combustion chamber 30 is fitted with a spark plug 18 adapted to make a spark while serving as an electrode for ionic current. The engine 100 further includes an exhaust system 20 provided with an oxygen sensor 21 for measuring the oxygen concentration in an exhaust gas at a location upstream of a three-way catalyst converter 22 disposed in a passage extending to a muffler (not shown).

The electronic control device 6 includes a microcomputer system comprising a central processing unit 7, a memory 8, an input interface 9, an output interface 11, and an A/D converter 10. The input interface 9 is adapted to receive the following signals: an intake pressure signal (a) output by an intake pressure sensor 13 for detecting the pressure in the surge tank 3; a cylinder identification signal (G1), a reference crank angle signal (G2) and an engine speed signal (b) indicative of the number of revolutions of the engine, which are output by a cam position sensor 14 for detecting a revolving state of the engine 100; a vehicles speed signal (c) output by a vehicle speed sensor 15; an IDL signal (d) output by an idle switch 16 for detecting whether the throttle valve 2 is open or not; a coolant temperature signal (e) output by a coolant temperature sensor 17 for detecting the temperature of the engine coolant; a current signal (h) output by the foregoing oxygen sensor 21; and like signals. The output interface 11, on the other hand, outputs a fuel injection signal (f) and an ignition pulse (g) to the fuel injection valve 5 and the spark plug 18, respectively.

Figure 2:
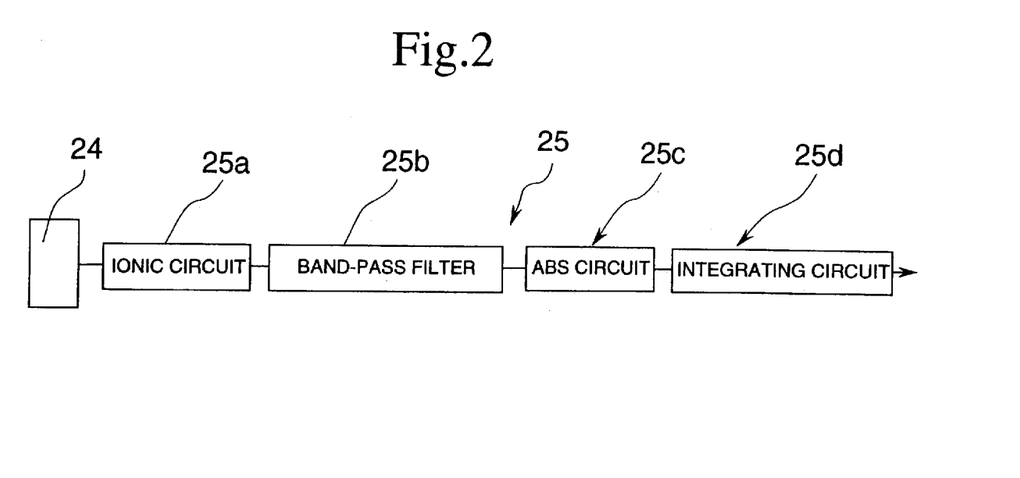
FIG. 2 is a block diagram of an ionic current measuring circuit in the embodiment.
Figure 3:
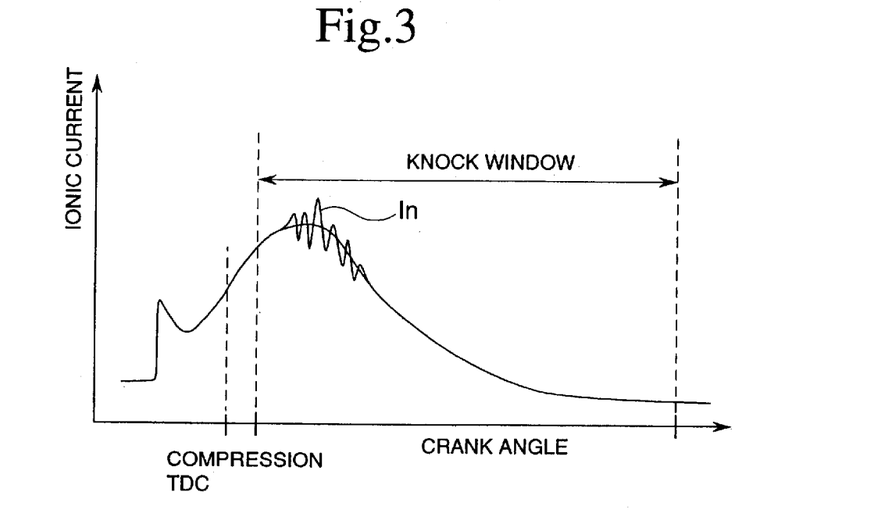
FIG. 3 is a waveform chart showing a state where a knock current overlaps an ionic current in the embodiment.

The spark plug 18 is connected to a biasing power source 24 for measuring the ionic current through a high-voltage diode 23. An ionic current measuring circuit 25 interconnects the input interface 9 and the biasing power source 24. The ionic current measuring circuit 25 is, for example, a circuit shown in FIG. 2, comprising an ionic circuit 25a adapted to amplify the ionic current and having a time constant not higher than a knock frequency for avoiding the production of a step noise upon input of a waveform, a band-pass filter 25b for extracting a peak value of the ionic current and a knock current In from the signals output by the ionic circuit 25a, an ABS circuit 25c for generating the absolute value of each of signals in a predetermined frequency band including the peak value of the ionic current and the knock current In thus extracted, and an integrating circuit 25d for integrating an absolute value signal output by the ABS circuit 25c. In such a circuit configuration, the ionic current steeply rises immediately after ignition, lowers temporarily, and then rises again to assume a maximum value or a peak at about a crank angle at which the combustion pressure assumes a maximum value, as shown in FIG. 3. Since the knock current In is likely to overlap the ionic current at a point past the peak, the knock current In is extracted within a knock window which is a knock detection period from a point before the peak of the ionic current to a point at which the ionic current substantially disappears. In this knock window, it is possible detect a peak value of the ionic current as well as knock current In. Any type of circuit known in the art is applicable to the ionic current measuring circuit 25. In this embodiment the circuit 25 is configured to detect the ionic current for each of the cylinders.

The electronic control device 6 stores therein a program adapted to correct the basic fuel injection time period with various correction coefficients determined according to engine conditions on the basis of information mainly comprising the intake pressure signal (a) output by the intake pressure sensor 13 and the engine speed signal (b) output by the cam position sensor 14, thereby to finally determine a time period for which the fuel injection valve 5 opens, i.e., an actuation time period (T) for which the injector is actuated, and then causes a proper amount of fuel to be injected into the intake system 1 according to the engine load by controlling the fuel injection valve 5 based on the actuation time period thus determined.

The electronic control device 6 is also programmed to detect occurrences of knocks in all driving regions of the engine 100 by measuring the ionic current flowing in the combustion chamber immediately after every ignition. Specifically, this knock detection program is adapted to detect the ionic current flowing in each cylinder from the initiation of combustion and judge a knock component overlapping the ionic current with reference to the judging level, thereby to detect occurrences of knocks. In the detection of a knock, a peak value of the ionic current is detected, and at least one of the judging level and the knock component is relatively corrected based on the peak value thus detected to make more difficult a judgment of the occurrence of a knock as the detected peak value of the ionic current increases.

Figure 4:
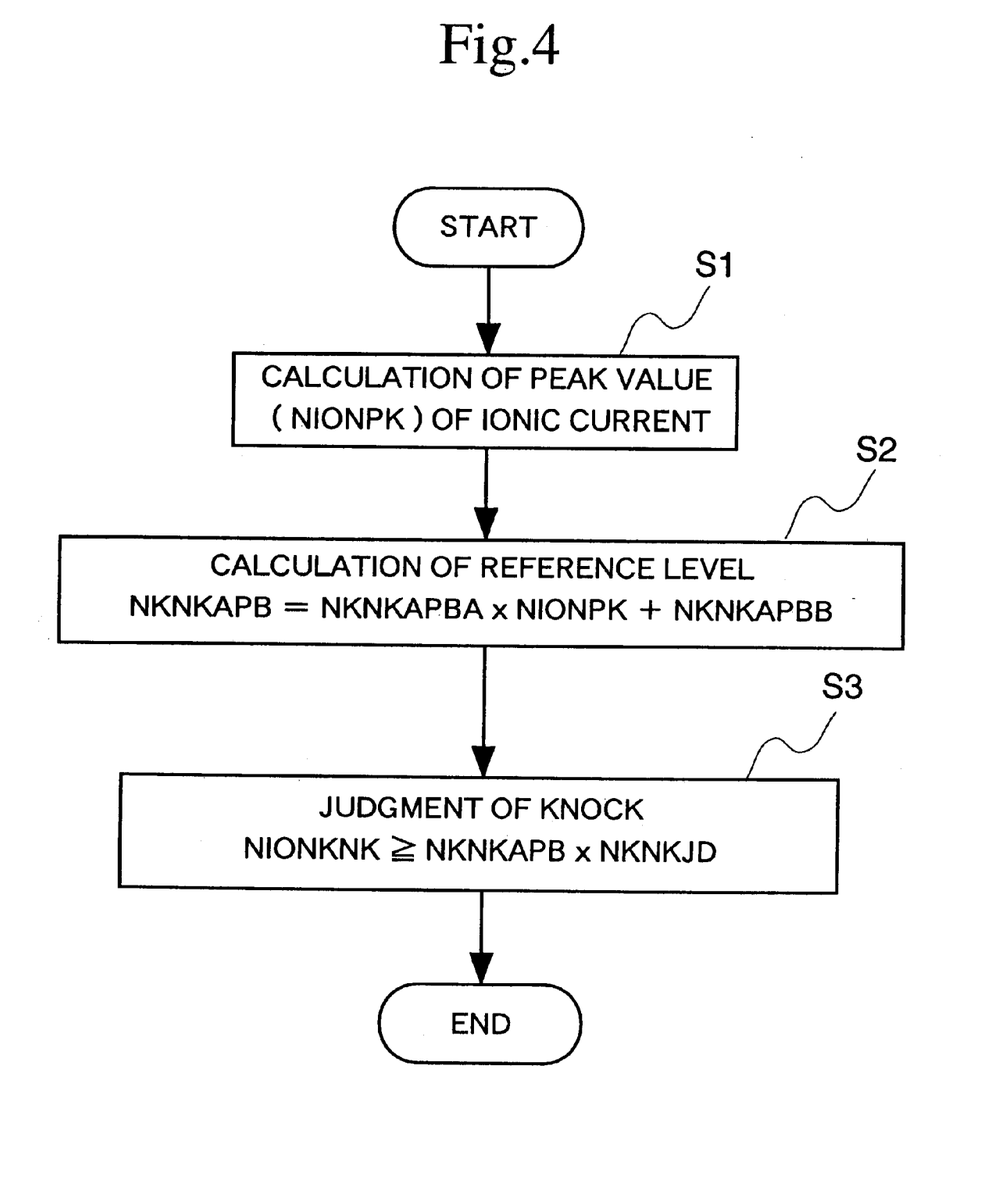
FIG. 4 is a flowchart showing the outline of a control procedure in an embodiment of the present invention.

The outline of this program of detecting knocks by means of ionic current is as shown in FIG. 4. According to the program shown, a reference level NKNKAPB in a normal combustion free of a knock is calculated from a peak value NIONPK which is a characteristic of the ionic current with use of a function, and a knock component NIONKNK obtained from knock current In is judged with reference to the reference level NKNKAPB to determine whether a knock occurs or not.

At step S1 in FIG. 4, the peak value NIONPK of the ionic current is calculated. The peak value NIONPK is obtained as an integrated value (area) of the amplitude component of a frequency by the integrating circuit 25d to avoid a pulse-like noise. The magnitude of a peak of the ionic current varies with different driving states, and the peak value NIONPK increases with increasing combustion pressure. At step S2, the peak value NIONPK thus obtained is substituted in the following equation to calculate the reference level NKNKAPB.

$$NKNKAPB = NKNPAKBA \times NIONPK + NKNKAPBB \quad (1)$$

In the above equation (1), NKNPAKBA is a proportionality constant and NKNKAPBB is an additive constant. The knock component NIONKNK increases as the peak value NIONPK increases even when the peak value NIONPK of the ionic current fluctuates up and down due to, for example, fluctuations of the output of the ionic circuit 25a. For this reason, the proportionality constant NKNPAKBA and the additive constant NKNKAPBB are found as functions of the relationship between the peak value NIONPK and a current component closely analogous to knock component NIONKNK obtained in a combustion free of a knock through experiments.

Figure 5:
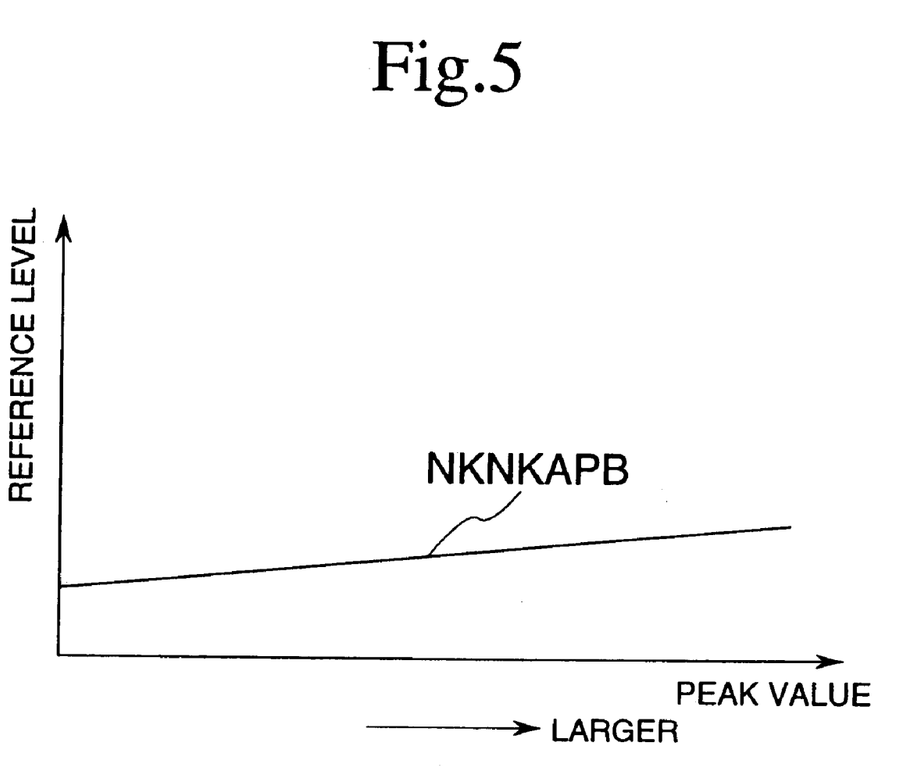
FIG. 5 is a diagram illustrating the operation of the embodiment.

The two are in a relationship of substantial similarity when the ionic current is high, low or intermediate. Therefore, the proportionality constant NKNPAKBA and the additive constant NKNKAPBB are each a single value irrespective of the magnitude of the ionic current. Accordingly, the reference level NKNKAPB is a linear function of the peak value NIONPK as shown in FIG. 5. Thus, the reference level NKNKAPB can be determined for every expansion stroke, namely, in every driving state regardless of the driving state without need of learning by substituting the detected peak value NIONPK into the equation (1).

At step S3, the reference level NKNKAPB is multiplied by an accommodation constant NKNKJD to determine judging level CLVL, and the judging level CLVL thus calculated is compared with the knock component NIONKNK to judge whether a knock occurs or not. The case where the knock component NIONKNK is not less than the judging level CLVL is judged as a case where a knock occurs. This is expressed by the following formula (2):

$$NIONKNK \geq KNKNAPB \times NKNKJD \quad (2)$$

In the above formula (2), NKNKJD is an accommodation constant that is a value determined taking fluctuations at the ionic current measuring circuit 25 into account so as to exclude any knock component NIONKNK which appears to be enlarged greater than its real magnitude at the ionic current measuring circuit 25. In this embodiment, the accommodation constant NKNKJD serves to establish the judging level CLVL so that the judging level CLVL is raised as the reference level NKNKAPB rises. Stated otherwise, the judging level CLVL is corrected in a direction such as to raise the judging level CLVL with increasing peak value NIONPK because the reference level NKNKAPB rises with increasing peak value NIONPK.

In establishing the judging level CLVL as above, the accommodation constant NKNKJD may be N (a positive number), for example four, by which the reference level NKNKAPB is multiplied. In the case where the accommodation constant NKNKJD is 1, i.e., the reference level NKNKAPB is equal to the judging level, the knock component NIONKNK may be divided by a factor of M (a positive number). As to the formula (2), the case where the knock component NIONKNK is divided by a factor of four and the reference level NKNKAPB is multiplied by a factor of four is equal to the case where the reference level NKNKAPB is multiplied by a factor of one. In the case where the reference level NKNKAPB is not extremely low and the knock component NIONKNK is not extremely large, the judging level CLVL may be established as a value twice the reference level NKNKPAB with the knock component NIONKNK divided by a factor of two.

When a knock occurs and knock current In overlaps the ionic current in the above configuration, knock component NIONKNK is extracted by the ionic current measuring circuit 25. In this case, at step S2, reference level NKNKAPB is calculated from the peak value NIONPK calculated at step S1, judging level CLVL is calculated based on the reference level NKNKAPB, and the knock component NIONKNK is compared with the judging level CLVL to detect the occurrence of the knock. At step S3 the case where the knock component NIPONKNK thus extracted is not less than the judging level CLVL is judged as a case where the knock occurs.

Since reference level NKNKAPB is calculated from peak value NIONPK of the ionic current for every expansion stroke in each cylinder and judging level CLVL is calculated based on the reference level NKNKAPB thus calculated, the judging level CLVL can be established for all the driving regions regardless of any driving state without need of learning. If the peak value NIONPA is large when knock component NIONKNK is extracted, a detection of knock is difficult even if the knock component NIONKNK is apparently enlarged to a magnitude greater than its real magnitude at the ionic current measuring circuit 25, because the judging level CLVL is raised as the peak value NIONPK increases. In this way it is possible to prevent a detection error such that the case where any knock does not occur is erroneously detected as an occurrence of knock. On the other hand, in the case where a knock really having a large magnitude occurs, such a knock can be detected because the magnitude of the knock is larger enough than the judging level.

Thus, the procedure for detecting the occurrence of a knock can be simplified as compared with the case requiring learning for every driving region, and the knock detection (judging) accuracy can be enhanced because such an inconvenience that the judging level fluctuates due to leaning errors. Further, the occurrence of a knock can be detected without any judging error even in a transient period in which the driving condition varies because peak value NIONPK in an occasion of combustion is calculated to establish judging level CLVL by which a knock in the same occasion of combustion is judged. Furthermore, since the judging level CLVL is established by multiplying the reference level NKNKAPB calculated based on the peak value NIONPK by a factor of N, detection accuracy can be improved by appropriately varying the factor of N according to driving states such as a low load and low speed revolution state, a low load and high speed revolution state, a high load and low speed revolution state, and a high load and high speed revolution state.

Description is made below of another embodiment of the present invention.

This embodiment is basically the same configuration but is particularly designed to prevent a degradation in knock judging accuracy due to noises, particularly white noises, arising from variability of the manufacture of ionic current measuring circuit 25, actuation of a radiator fan during traveling of a vehicle, or the like. Such a white noise overlaps the ionic current to cause peak value NIONPK to offset, so that reference level NKNKAPB becomes higher than its real level by a white noise component, thereby lowering the knock judging accuracy.

Figure 6:
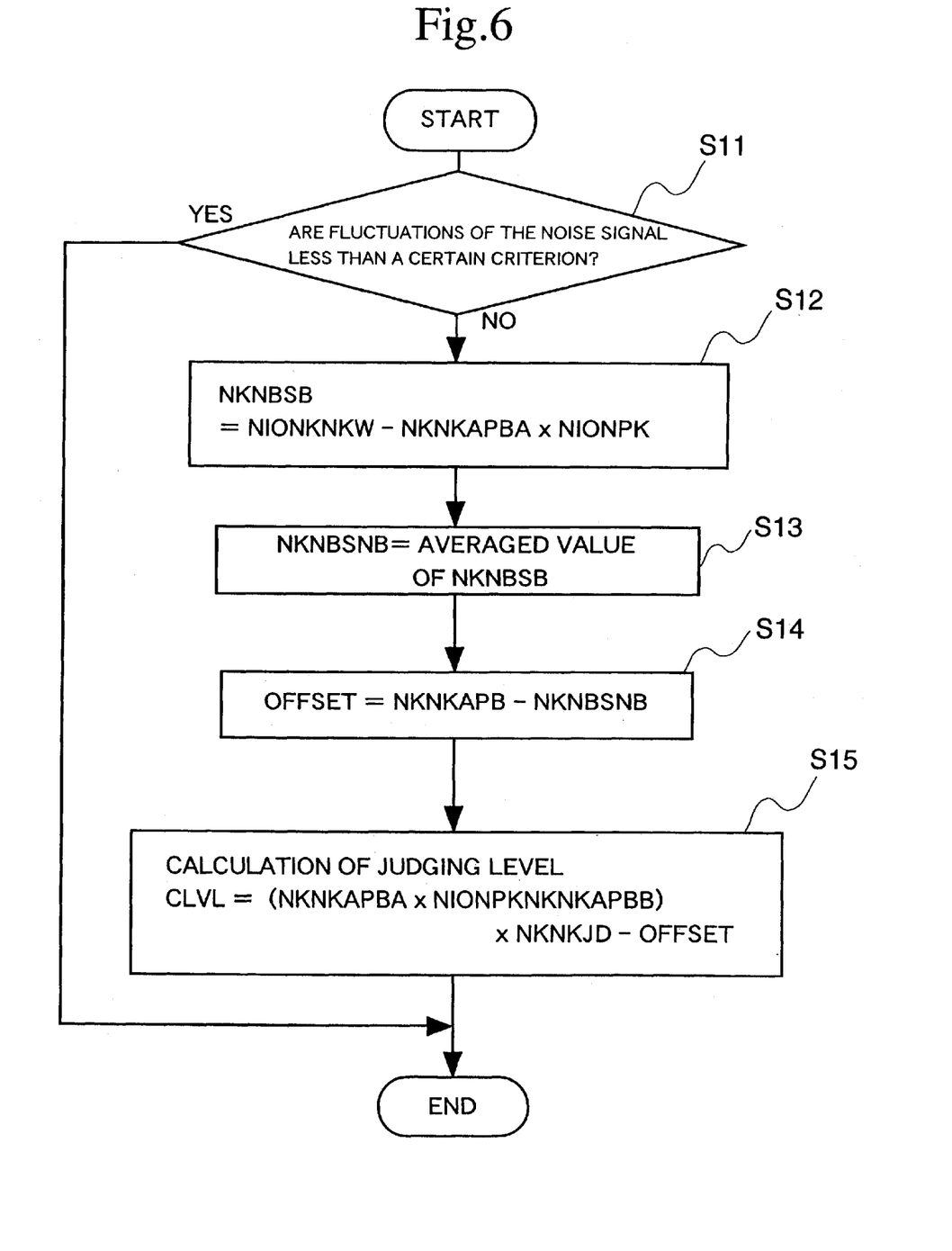
FIG. 6 is a flowchart showing the outline of a control procedure in another embodiment of the present invention.
Figure 7:
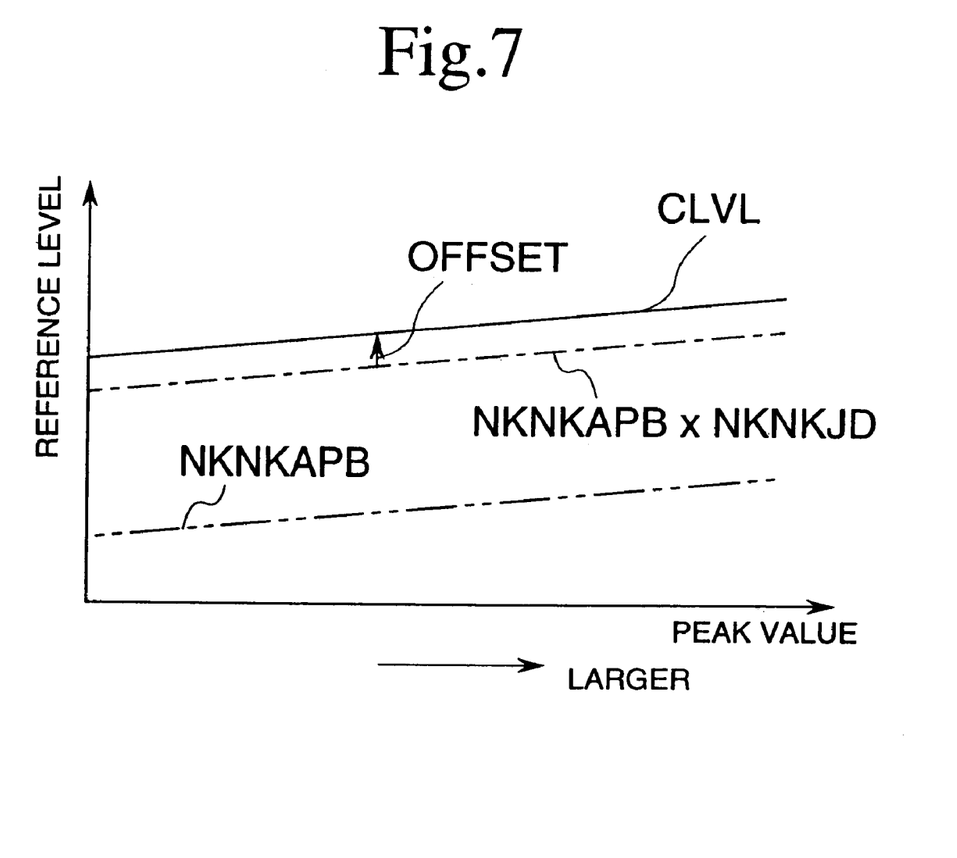
FIG. 7 is a diagram illustrating the operation of the latter embodiment.

FIG. 6 shows the outline of a knock detection procedure in this embodiment. As shown, step S11 determines whether fluctuations of a current signal NIONKNKW caused by a noise overlapping the ionic current to be detected in the knock window are not larger than a criterion of judgment previously established. More specifically, in the case where a knock does not occur but a white noise overlapping the ionic current occurs, the current signal NIONKNKW overlapping the ionic current is detected in the knock window as in the detection of knock current In. When the current signal NIONKNKW thus detected exceeds the criterion of judgment, the current signal NIONKNKW is judged as being caused by the white noise. The criterion of judgment is set lower than the fluctuation level of knock current In caused by a relatively small knock so as to allow judgment of white noises. If the fluctuations of the current signal NIONKNKW are judged less than the criterion of judgment at step S11, this control procedure ends.

At step S12 a variable NKNBSB is calculated based on the peak value NIONPK of the ionic current overlapped by the noise and the current signal NIONKNKW. In the case where a noise does not overlap the ionic current, the value of the current signal NIONKNKW is equal to the product of the peak value NIONPK multiplied by the proportionality constant NKNKAPBA. In the case where a noise overlaps the ionic current, by contrast, a difference equivalent to this noise results. Such a difference is used as the variable NKNBSB at this step. This is expressed by the following equation (3):

$$NKNBSB=NIONKNKW-NKNKAPBA \times NIONPK \quad (3)$$

At step S13 the mean value of such variables NKNBSB is calculated to absorb fluctuations in expansion strokes. At step S14 an offset value OFFSET of reference level NKNKAPB reflecting the noise is calculated from the mean value NKNBSNB and reference level NKNKAPB obtained in the case where a noise does not overlap the ionic current. This is expressed by the following equation (4):

$$OFFSET=NKNKAPB-NKNBSNB \quad (4)$$

At step S15 judging level CLVL is calculated by subtracting the offset value OFFSET from the product of the reference level NKNKAPB multiplied by accommodation constant NKNKJD. This is expressed by the following equation (5):

$$CLVL=NKNKAPB \times NKNKJD-OFFSET \quad (5)$$

If additive constant NKNKAPBB in the equation (1) is learned based on the ionic current overlapped by a noise to obtain reference level NKNKAPB and judging level CLVL is calculated by multiplying the reference level NKNKAPB by accommodation constant NKNKJD, the level of the noise is also multiplied by the accommodation constant NKNKJD. Accordingly, there may be a case where a knock having a negligible magnitude, for example, is erroneously judged as a knock or a case where judgment of a small noise becomes impossible. According to this embodiment, in contrast, the judging level CLVL is calculated using the equations (3), (4) and (5) without multiplying the offset value OFFSET by the accommodation constant NKNKJD and, hence, the judging level can be established by correcting the reference level NKNKAPB so as not to take the offset value into account. Thus, it is possible to deter the occurrence of such an inconvenience that a knock having a negligible magnitude is erroneously judged as a knock or, conversely, judgment of a small noise becomes impossible, whereby the knock detection accuracy can be improved.

Though the judging level CLVL is established by multiplying the reference level NKNKAPB by the accommodation constant NKNJD in this embodiment, the knock component NIONKNK may be divided by a factor of M (a positive number) with the reference level NKNKAPB, as it is, being used as the judging level, as described in the former embodiment.

As has been described above, the method according to the present invention makes more difficult the judgment of whether a knock occurs or not as a detected peak value increases by relatively correcting at least one of the knock component and the judging level. Accordingly, even when the knock component is apparently enlarged to a level higher than its real level with increasing peak value of the ionic current, such a knock component apparently higher than its real level can be excluded from the detection of a knock. Thus, the method offers an improved knock detection accuracy. For instance, the method will not make a detection error such that a knock component that is really too small to judge as a knock but appears to be enlarged to a value higher than its real level due to the peak value of ionic current increased by fluctuations in driving state is erroneously detected as an indication of the occurrence of a knock. Thus, the method is capable of detecting only knock components indicative of real knocks thereby accurately detecting occurrences of knocks. Further, the method is capable of detecting a knock occurring in an occasion of combustion based on the value of a peak appearing in the same occasion thereby detecting occurrences of knocks without any detection error even in a transient period of combustion in which the driving state is inconstant.

Where the method has a feature that the correction of at least one of the judging level and the knock component is made in at least one of a direction such as to decrease the knock component as the peak current increases and a direction such as to raise the judging level as the peak current increases, the correction is made such that the knock component is relatively decreased as the peak value of the ionic current increases and, hence, a detection error can assuredly be prevented even if an apparent knock appears to have a magnitude equal to the magnitude of a real knock. Thus, the method enjoys an improved detection accuracy.

Where the method has a feature that the judging level is determined based on a reference level for judging the knock component, the reference level being calculated from a peak value of the ionic current in a normal combustion free of a knock, the method is capable of correcting the judging level to a proper level by correcting the calculated reference level obtained in the normal combustion free of a knock with reference to an actually measured value. Further, where the method has a feature that the judging level is determined as a value obtained by multiplying the reference level by a factor of a positive number N and compared with the knock component or the judging level is determined as being equal to the reference level and compared with a value obtained by dividing the knock component by a factor of a positive number M, the judging level can be properly established in a manner to accommodate variability of the reference level. When the factor by which the reference level is multiplied or the knock component is divided is varied according to driving states, for example, according to the number of revolutions of the engine or the load imposed on the engine, a further improvement in detection accuracy will result.

Where the method further comprises the step of detecting a noise component overlapping the ionic current in a driving state free of a noise during a knock component detecting period, wherein the correction of one of the judging level and the knock component is made based on the noise component thus detected in order to minimize the influence of noises produced in an actual driving state of the internal combustion engine, the method makes it possible to judge a knock with exclusion of different noises, particularly white noises or analogous noises, which result from variability in the manufacture of an electric circuit adapted to process the ionic current or from different driving states, thereby bringing an improved judgment accuracy.

While only certain presently preferred embodiments of the present invention have been described in detail, as will be apparent for those skilled in the art, certain changes and modifications may be made in embodiment without departing from the scope of the present invention as defined by the following claims.

What is claimed is:

1. A method of detecting an occurrence of a knock in an internal combustion engine by detecting an ionic current flowing in a cylinder of the engine from initiation of combustion therein and judging a knock component overlapping the ionic current based on a judging level, the method comprising the steps of:

detecting a peak value of the ionic current; and relatively correcting at least one of the judging level and the knock component based on the peak value thus detected so as to make more difficult a judgment of whether the knock occurs or not as the detected peak value increases.

2. The method according to claim 1, wherein the correction of at least one of the judging level and the knock component is made in at least one of a direction such as to decrease the knock component as the peak current increases and a direction such as to raise the judging level as the peak current increases.

3. The method according to claim 1, wherein the judging level is determined based on a reference level for judging the knock component, the reference level being calculated from a peak value of the ionic current in a normal combustion free of the knock.

4. The method according to claim 3, wherein the judging level is determined as a value obtained by multiplying the reference level by a factor of a positive number N and compared with the knock component, or the judging level is determined as being equal to the reference level and compared with a value obtained by dividing the knock component by a factor of a positive number M.

5. The method according to claim 1, further comprising the step of detecting a noise component overlapping the ionic current in a driving state free of a noise during a knock component detecting period, wherein the correction of one of the judging level and the knock component is made based on the noise component thus detected.

6. The method according to claim 2, wherein the judging level is determined based on a reference level for judging the knock component, the reference level being calculated from a peak value of the ionic current in a normal combustion free of the knock.

7. The method according to claim 6, wherein the judging level is determined as a value obtained by multiplying the reference level by a factor of a positive number N and compared with the knock component, or the judging level is determined as being equal to the reference level and compared with a value obtained by dividing the knock component by a factor of a positive number M.

8. The method according to claim 2, further comprising the step of detecting a noise component overlapping the ionic current in a driving state free of a noise during a knock component detecting period, wherein the correction of one of the judging level and the knock component is made based on the noise component thus detected.

9. The method according to claim 3, further comprising the step of detecting a noise component overlapping the ionic current in a driving state free of a noise during a knock component detecting period, wherein the correction of one of the judging level and the knock component is made based on the noise component thus detected.

10. The method according to claim 4, further comprising the step of detecting a noise component overlapping the ionic current in a driving state free of a noise during a knock component detecting period, wherein the correction of one of the judging level and the knock component is made based on the noise component thus detected.

* * * * *